US010885525B1

(12) United States Patent
Sharafi (10) Patent No.: US 10,885,525 B1
(45) Date of Patent: Jan. 5, 2021

(54) METHOD AND SYSTEM FOR EMPLOYING BIOMETRIC DATA TO AUTHORIZE CLOUD-BASED TRANSACTIONS

(71) Applicant: Faraz Sharafi, San Diego, CA (US)

(72) Inventor: Faraz Sharafi, San Diego, CA (US)

( * ) Notice: Subject to any disclaimer, the term of this patent is extended or adjusted under 35 U.S.C. 154(b) by 304 days.

(21) Appl. No.: 15/710,550

(22) Filed: Sep. 20, 2017

(51) Int. Cl.
*G06F 16/2455* (2019.01)
*G06Q 20/40* (2012.01)
*H04L 29/06* (2006.01)
*G06F 21/32* (2013.01)

(52) U.S. Cl.
CPC ... *G06Q 20/40145* (2013.01); *G06F 16/2455* (2019.01); *G06F 21/32* (2013.01); *H04L 63/0861* (2013.01)

(58) Field of Classification Search
USPC .......................................................... 705/44
See application file for complete search history.

(56) References Cited

U.S. PATENT DOCUMENTS

| 2006/0143441 | A1* | 6/2006 | Giobbi | G06F 21/32 |
| | | | | 713/155 |
| 2008/0082932 | A1* | 4/2008 | Beumer | G06F 9/543 |
| | | | | 715/770 |
| 2008/0209227 | A1* | 8/2008 | Venkatesan | H04L 9/3231 |
| | | | | 713/186 |
| 2009/0024933 | A1* | 1/2009 | Smedley | A63F 13/12 |
| | | | | 715/753 |
| 2017/0063549 | A1* | 3/2017 | Zwart | G07C 9/00087 |

* cited by examiner

*Primary Examiner* — Joseph W. King
*Assistant Examiner* — Amit Patel
(74) *Attorney, Agent, or Firm* — Hawley Troxell Ennis & Hawley LLP; Philip McKay; Rivkah Young (57) ABSTRACT

A method and system for employing biometric data includes first and second user computing systems coupled to respective first and second biometric devices for generating biometric data. A first user of the first user computing system uses the first biometric device, thus causing a generation of first biometric data which is then used as a database index to locate and authorize access to a database zone exclusively dedicated to the first user. The first user can further access the database zone on the second user computing system, and authorize access to a portion of data within the database zone to a second user of the second user computing system.

18 Claims, 2 Drawing Sheets

METHOD AND SYSTEM FOR EMPLOYING BIOMETRIC DATA TO AUTHORIZE CLOUD-BASED TRANSACTIONS

BACKGROUND

Modern electronic devices, including hand-held computing systems, desktop computing systems, smart watches, tablets, smartphones and the like are often configured to allow a user to access data stored in internal and external databases. Databases employed with such systems encompass databases that are provided behind the scenes, such as those databases that may be used by one or more application programs of the particular computing system, and further encompass data storage locations which store pictures, files and other data items for a user registered to the device. Thus, a person typically has access to those database locations by virtue of having the electronic device in their hand, whether the person is the owner of the device, or not.

Typically, when a user of a computing system wishes to access external data for some reason, the user, such as a user of a smartphone or a desktop computing system, unlocks the computing system through use of a password or other security mechanism, and then accesses one or more application programs resident on that computing system, or through a web browser, and data stored within an external database is accessed using one or more credentials previously stored within the application program, or otherwise previously stored on the computing system.

In the case of a user using a smartphone, for example, the user would unlock the smartphone using one or more of a fingerprint reader, a password entered through a user interface of a security program on the smartphone, or some similar mechanism, and then access an application program or a web browser to interact with data stored in one or more databases. Typically, the application program or web browser either uses credentials previously stored within the smartphone, or uses access that has already been granted to the smartphone by virtue of the phone being already associated with an external or internal account, such as a username and a password, and is granted access and use rights to data stored in the database based on those previously stored credentials.

While this system of accessing and using data stored in external databases and other external data storage locations has proven useful, there is a longstanding technical problem in the technical field of data security. A tremendous security deficiency exists wherein a person having either possession of the device or the user credentials, but not actual authority, is typically able to access, copy, use, change and destroy the externally stored data. Thus, for example, a hacker or other nefarious user who gains possession of the user credentials, through hacking the user computer or a network the user computer is connected to or acquiring them from watching the user enter them or through any other means, essentially has the same access rights as the user would have. This is clearly a security issue, since user credentials are often treated somewhat casually by the user credential owners, and are also often entered multiple times a day. Casual treatment of the electronic device or the credentials, and the ability for an unrelated, or even nefarious, user to utilize those user credentials as if the nefarious or unrelated user was the user credential owner leave user data of all types vulnerable to discovery, tampering, destruction, or other undesired actions. This security deficiency is ubiquitous because of the common nature of current data access mechanisms and processes. Further, the problem is internet centric, due to the way external databases are employed and accessed throughout modern networks.

What is needed is a method and system for easily and efficiently solving the longstanding and tremendous security deficiency discussed herein. Thus, what is needed is a method and system where a remote person is required to have actual authority to access, copy, use, change and destroy data stored within a remote database. Thus, it would be beneficial to solve the longstanding security problem and enable users to manage data operations while providing enhanced security and ensuring that data may only be accessed and operated on by the data owner or other authorized user.

SUMMARY

Embodiments of the present disclosure address some of the shortcomings associated with prior art processes employed for database access and data management by using live biometric data received from a biometric device of a user computing system as a key or index to a database zone of the user.

In one embodiment, live biometric data is created, received or otherwise made available to one or more application processes or programs. The live biometric data is then used as a key to identify one or more particular database zones associated with the biometric data. Access rights are developed and granted to a user computing system providing the live biometric data, whether that live biometric data is provided through a previously known computing system, or is alternatively provided through a computing system that has not previously accessed the database zone.

Using live biometric data as a key to develop and apply the access rights ensures that a data owner associated with user data stored within the database zone is physically present at the computing system being granted the access rights, thus solving the internet centric and ubiquitous security problem outlined above in a convenient manner easily employed within existing computing systems having biometric devices.

As explained above, a longstanding technical problem exists in the field of data security in prior art systems wherein a person having either possession of an already-authorized accessing device or user credentials of an authorized user, but not actual authority, is typically able to access, copy, use, change and destroy externally stored data. Embodiments disclosed herein provide technical solutions to that longstanding problem in the technical field of data security, thus improving that technical field, among others.

In one embodiment, a method and system for employing biometric data to authorize cloud based transactions includes receiving first biometric data generated through a user interacting with a first biometric device coupled to a first computing system, the first biometric data uniquely identifying a user to which the biometric data applies. In one embodiment, a channel is established between the first biometric device and processes governing access to databases in order to ensure that the biometric data used in later process operations is live, and thus is not, for example, biometric data previously acquired from a user and stored for later use.

By using live biometric data as the key or index used to access data of a database zone of the user, a greater probability results that the data owner or other authorized user is the same person as the user providing the biometric data results. This is due to the live biometric data being originated from a biometric device of a computing system relatively synchronously with the biometric data being submitted to later processes which determine any access rights which will be granted to the user or user computing system.

Herein, granting access to a user or a user computing system is discussed in various embodiments. It is intended that granting access rights to a user be relatively synonymous with granting access rights to a user computing system believed to be under the current control of that user.

In one embodiment, the method further includes accessing, by the first computing system using the first biometric data as a database index or key, a database zone exclusive to the user. Accessing a database zone using the biometric data as an index or key involves, in one embodiment, comparing the live biometric data to previously stored biometric data and determining a match between them, and then opening a communications pathway between the computing system and a portion of a database associated with the previously stored biometric data.

In one embodiment, the method further includes receiving, through a user interface of the first computing system, one or more commands that trigger the performance of one or more operations on data stored within the database zone.

In one embodiment, the method further includes performing, as a result of the triggering, the one or more operations on data stored within the database zone.

In one embodiment, the method receives, as a result of performing one or more operations on data stored within the database zone, results data resulting from performance of the one or more operations.

Embodiments discussed herein improve security of data stored in a database zone, and further allow greater flexibility as to the available computing systems used to access data of the database zone, since any computing system having a biometric device for capturing and/or otherwise generating live biometric data may be used by the user to access the data. Therefore, by employing live biometric data and using the live biometric data as a database index or key to a database zone owned or otherwise controlled by a user, the embodiments discussed herein represent a technical solution to the long-standing problems discussed above.

Common reference numerals are used throughout the figures and the detailed description to indicate like elements. One skilled in the art will readily recognize that the above-described figures are examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying figures, which depict exemplary embodiments. Embodiments may be implemented in many different forms and should not be construed as limited to the embodiments set forth herein, shown in the figures, and/or described below. Rather, these exemplary embodiments are provided to allow a complete disclosure that conveys the principles of the invention, as set forth in the claims, to persons of skill in the art.

Further, although process operations are often depicted as being a series of particular process operations, the sequence of process operations discussed herein is exemplary, and is thus only one sequence out of many that may be possible, and that remain within the scope and spirit of this disclosure, as set forth in the claims.

Herein, a database or database system can be, but is not limited to, any data storage and/or data management system implemented by or with a computing system, accessed through one or more servers, accessed through a network, accessed through a cloud, and/or provided through any system or by any means, as discussed herein, and/or as known in the art at the time of filing, and/or as developed after the time of filing.

As used herein, the terms "computing system," "computing device," and "computing entity," include, but are not limited to, the following: a server computing system; a workstation; a desktop computing system; a mobile computing system, including, but not limited to, smartphones, portable devices, and/or devices worn or carried by a user; a virtual asset; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the terms "computing system" and "computing entity," can denote, but are not limited to, the following: systems made up of multiple virtual assets, server computing systems, workstations, desktop computing systems, mobile computing systems, switching systems, routers, hardware systems, communications systems, proxy systems, gateway systems, firewall systems, load balancing systems, or any devices that can be used to perform the processes and/or operations as described herein.

Herein, the terms "mobile computing system" and "mobile device" are used interchangeably and include, but are not limited to the following: a smartphone; a cellular phone; a digital wireless telephone; a tablet computing system; a notebook computing system; any portable computing system; a two-way pager; a Personal Digital Assistant (PDA); a media player; an Internet appliance; devices worn or carried by a user; or any other movable/mobile device and/or computing system that includes components that can execute all, or part, of any one of the processes and/or operations as described herein.

Herein, a biometric device is a device that is typically coupled to or is an integral component of a computing system, wherein the device has, as at least one of its primary purposes, the creation or generation of biometric data, e.g. physiological or behavioral characteristic data, representing a characteristic of a user of the biometric device. Typically, such biometric devices include one or more of a fingerprint reader, a palm print reader, a palm vein reader, a camera for facial recognition or other use, iris, retina, or other eye-related devices, voice recognition devices, and the like.

Herein, the term "production environment" includes the various components, or assets, used to deploy, implement, access, and use, a given application, including database applications, for example, as that application is intended to be used. In various embodiments, production environments include multiple computing systems and/or assets that are combined, communicatively coupled, virtually and/or physically connected, and/or associated with one another, to provide the production environment implementing the application.

As specific illustrative examples, the assets making up a given production environment can include, but are not limited to, the following: one or more computing environments used to implement the application in the production environment such as a data center, a cloud or other computing environment, a dedicated hosting environment, and/or one or more other computing environments in which one or more assets used by the application in the production environment are implemented; one or more computing systems or computing entities used to implement the application in the production environment; one or more virtual assets used to implement the application in the production environment; one or more supervisory or control systems, such as hypervisors, or other monitoring and management systems used to monitor and control assets and/or components of the production environment; one or more communications channels for sending and receiving data used to implement the application in the production environment; one or more access control systems for limiting access to various components of the production environment, such as firewalls and gateways; one or more traffic and/or routing systems used to direct, control, and/or buffer data traffic to components of the production environment, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement the application in the production environment; one or more databases used to store data in the production environment; one or more internal or external services used to implement the application in the production environment; one or more backend systems, such as back-end servers or other hardware used to process data and implement the application in the production environment; one or more software systems used to implement the application in the production environment; and/or any other assets/components making up an actual production environment in which an application is deployed, implemented, accessed, and run, e.g., operated, as discussed herein, and/or as known in the art at the time of filing, and/or as developed after the time of filing.

As used herein, the term "computing environment" includes, but is not limited to, a logical or physical grouping of connected or networked computing systems and/or virtual assets using the same infrastructure and systems such as, but not limited to, hardware systems, software systems, and networking/communications systems. Typically, computing environments are either known, "trusted" environments or unknown, "untrusted" environments. Typically, trusted computing environments are those where the assets, infrastructure, communication and networking systems, and security systems associated with the computing systems and/or virtual assets making up the trusted computing environment, are either under the control of, or known to, a party.

In various embodiments, each computing environment includes allocated assets and virtual assets associated with, and controlled or used to create, and/or deploy, and/or operate an application. Herein, computing system and computing environment are used interchangeably.

In various embodiments, one or more cloud computing environments are used to create, and/or deploy, and/or operate an application that can be any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, and/or as known in the art at the time of filing, and/or as developed after the time of filing.

In many cases, a given application or service may utilize, and interface with, multiple cloud computing environments, such as multiple VPCs, in the course of being created, and/or deployed, and/or operated.

As used herein, the term "virtual asset" includes any virtualized entity or resource. In various embodiments, the virtual assets can be, but are not limited to, the following: virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through a cloud computing environment; and/or any other virtualized assets and/or sub-systems of physical devices such as mobile devices, remote sensors, laptops, desktops, point-of-sale devices, etc., located within a data center, within a cloud computing environment, and/or any other physical or logical location, as discussed herein, and/or as known/available in the art at the time of filing, and/or as developed/made available after the time of filing.

In various embodiments, any, some, or all, of the assets making up a given production environment discussed herein, and/or as known in the art at the time of filing, and/or as developed after the time of filing can be implemented as one or more virtual assets.

In one embodiment, two or more assets, such as computing systems and/or virtual assets, and/or two or more computing environments are connected by one or more communications channels including but not limited to, Secure Sockets Layer (SSL) communications channels and various other secure communications channels, and/or distributed computing system networks, such as, but not limited to the following: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network" includes, but is not limited to, any network or network system such as, but not limited to, the following: a peer-to-peer network; a hybrid peer-to-peer network; a Local Area Network (LAN); a Wide Area Network (WAN); a public network, such as the Internet; a private network; a cellular network; any general network, communications network, or general network/communications network system; a wireless network; a wired network; a wireless and wired combination network; a satellite network; a cable network; any combination of different network types; or any other system capable of allowing communication between two or more assets, virtual assets, and/or computing systems, whether available or known at the time of filing or as later developed.

Herein, the term "party" and "user" are used interchangeably to denote any party and/or entity that interacts with, any computing system, production environment or other computing systems or devices discussed herein.

Method and System

In one embodiment, a method and system for employing biometric data to authorize remote transactions, e.g. cloud-based or other remote database-related transactions, includes one or more computing systems having at least one computing processor and at least one memory coupled to the at least one computing processor, the memory including computing processor executable instructions for performing the process operations discussed herein.

In one embodiment, a process of authentication begins when live biometric data is generated, created, received or otherwise made available by one or more biometric devices to one or more processes or application programs executing on a user computing system.

More specifically, in one embodiment, a method and system for employing biometric data to authorize cloud based transactions includes receiving first biometric data generated through a user interacting with a first biometric device coupled to a first computing system, the first biometric data uniquely identifying a user to which the biometric data applies. In one embodiment, live biometric data is generated by the biometric device and passed directly or through a device driver to a security or other application program of the first computing system, ensuring that the biometric data is live and thus has not been previously stored and then retrieved from local or external storage.

In one embodiment, a channel or other communications pathway is established between the first biometric device and processes governing access to databases, in order to ensure that the biometric data created by the biometric device and used in later process operations is live, and is thus not biometric data previously acquired from a user and stored for later use.

In one embodiment, live biometric data is used as an index or key to determine one or more particular database zones associated with a previously stored biometric data that matches the live biometric data within a predetermined degree of tolerance. The matching establishes that the database zones are owned or otherwise controlled by the user providing the live biometric data through interaction with the biometric device. In one embodiment, the database zone or zones are exclusive to the user, and the database zone is only accessible using biometric data of the user.

In one embodiment, one or more database zones contain first data that is exclusively owned or controlled by a single user, while second data of one or more same or different database zones may be owned or otherwise controlled by two or more users.

In one embodiment, a single database zone is shared by two or more users, each having separate biometric data previously stored for use in determining a later match between live biometric data and the stored biometric data. If such a match is found for either or both users, separately or together, a database session is established for one or more of the two or more users of the shared database zone.

In an exemplary embodiment, a first database zone is exclusive to a first user, a second database zone is exclusive to a second user, and a third database zone is shared by both the first and second users. Further, in the case of a database zone being shared by two or more users, access rights determined for each user may or may not be identical. For example, a first user may have read and write access to all of the data within a database zone, while a second user may only have read access to a portion of the data of the database zone.

By using live biometric data as the key or index used to access data of a database zone of the user, a greater probability results that the data owner or other authorized user is the same person as the user providing the biometric data results. This is due to the live biometric data being originated from a biometric device of a computing system relatively synchronously with the biometric data being submitted to later processes which determine any access rights which will be granted to the user or user computing system.

In one embodiment, access rights are developed and granted to the user computing system that provided the live biometric data, and thus a computing system that is currently associated with the user that provided the live biometric data, whether that live biometric data is provided through a computing system previously known to the system, or is alternatively provided through a computing system that has not previously accessed the database zone.

In one embodiment, database sessions established using biometric data only last for a predefined time period after those sessions are established, and the database session and access to the database zone is automatically terminated after that predefined time period elapses following the establishment of the database session.

In one embodiment, a database session allowing a user to use a database zone is terminable by the user. In one embodiment, termination of a current database session occurs when the user engages the biometric process at a later time, while the current database session is still valid. Thus, for example, when the user uses their own smartphone and access is granted through use of a biometric device of that smartphone, the user may optionally perform one or more commands on data of the database zone. In a situation where the same user then authenticates or otherwise initiates or completes database session establishment processes using a second smartphone, such as the smartphone of a colleague, the initiation of a second database session establishment process such as those described herein terminates, in one embodiment, one, two, all, or any number of previously open database sessions. For example, the first database session would terminate as to the user's smartphone, during or following a time period while the second database session for the colleague's smartphone is being established, or is active.

Providing the live biometric data through a user computing system previously known to the system or identified within a registration process or other activity allows the system, in one embodiment, to authorize one or more commands that are not typically authorized to be performed using a computing system that is not already known to the system. In one embodiment, a user may determine which commands are available, and when those commands are available, during a registration process when user preference data is established.

Using biometric data as a key to develop and apply the access rights ensures that a data owner associated with user data stored within the database zone is physically present at or nearby the computing system being granted the access rights, thus solving the internet centric and ubiquitous security problem outlined above in a convenient manner easily employed within existing computing systems having biometric devices.

Some biometric devices, such as facial recognition devices, allow for biometric data to be created when a user or other subject of the biometric device is near the computing system, but not necessarily in contact with any portion of the computing system.

Using a biometric device that requires that a user touch it in order to generate the biometric data, such as a fingerprint reader, as one example, ensures that the user is actually physically in contact with at least the biometric device, and thus likely in control of that computing system. In contrast, a facial recognition system biometric device allows the user to be nearby, but not necessarily in physical contact with or in control of the computing system coupled to the biometric device, when biometric data is generated from that biometric device. In one embodiment, if greater security is desired, two or more different biometric devices representing two or more biometric device types, such as, for example, a camera for facial recognition and a fingerprint reader, are coupled to the same computing system, and using both biometric devices to produce biometric data and then using the biometric data from both to authenticate is required in order to access data of a database zone. Consequently, in one embodiment, a multifactor authentication capability using biometric devices is provided.

In one embodiment, the live biometric data is then used as a key or database index to determine a database zone owned or otherwise controlled by the user. In one embodiment, access rights are also determined, at least partly using the biometric data, and access rights are granted which govern the user's access to data stored within the determined database zone. In one embodiment, the database zone is exclusive to the user, and the database zone is only accessible using biometric data of the user.

By using live biometric data as the actual key or index used to access data of a database zone of the user, a greater probability of the data owner or other authorized user actually being same person as the user providing the biometric data results, since the live biometric data originated from a biometric device of a computing system synchronously with the biometric data being submitted to later processes which determine any access rights which will be granted to the user.

In one embodiment, the method further includes receiving, through a user interface of the first computing system, one or more commands that trigger the performance of one or more operations on data stored within the database zone. In various embodiments, the commands include one or more of a select data command, a copy command, a delete command, a command to transfer data to a clipboard, a command to transfer data from one database location to another, and an execute command (in the case of an executable application program, for example, being stored within the database zone of the user).

In one embodiment, the method further includes performing, as a result of the triggering, the one or more operations on data stored within the database zone. For example, a command to transfer a copy of data to a clipboard, for possible later transfer to another person who may not have their own database zone already allocated, may incorporate a copy command and a store command, where the copy command copies selected data in memory, and the store command then stores that selected/copied data to a clipboard storage location.

In one embodiment, a clipboard is a temporary data storage location within a database zone, and further operations, if any, performed on data stored in the clipboard require authentication of a user prior to interacting with that data in future events, from other computing systems, etc.

In one embodiment, a clipboard is a temporary data storage location outside the database zone, and further operations, if any, performed on data stored in the clipboard location may be performed without authentication of a user prior to interacting with that data in future events, from other computing systems, etc.

In one embodiment, the method receives, as a result of performing one or more operations on data stored within the database zone, results data resulting from performance of the one or more operations.

In one embodiment, a history log is prepared which records actions taken on data, which data each action was taken on, whether the action was performed successfully, and if the action was not performed successfully, a failure reason, failure code, or other description of conditions of or surrounding the failure.

In one embodiment, should the same user now move to a different, e.g. a second computing system, such as a computing system owned and usually controlled by a different person or user, and authenticate using biometric data which points to a same database zone where data was copied to a clipboard, the same user is presented with options to move the data to a storage location outside the database zone, such as, for example, to a storage location within the second computing system, or to another location, as desired.

In one embodiment, an established database session using a given database zone is active for a predefined time period, and access to the database zone for a given user computing system is automatically terminated after that predefined time period elapses, for example, following establishment of the database session.

In one embodiment, a current database session allowing a user to use a database zone is terminable by the user. In one embodiment, termination of a current database session occurs when the user engages the biometric process again, while the current database session is valid.

Assume, for example, a user uses their own smartphone and establishes a database session using a biometric device of that smartphone, and optionally performs one or more commands on data of the database zone. The same user then begins or otherwise attempts to establish a second, different database session using a second, different smartphone, such as the smartphone of a colleague. In one embodiment, the first database session terminates as to the user's smartphone, during or following a time period while the second database session for the colleague's smartphone is being established, or is active.

Additional details will be provided in the context of a production environment configured to perform the processes discussed herein.

As discussed above, a tremendous security deficiency exists in prior art systems wherein a person having either possession of the device or the user credentials, but not actual authority, is typically able to access, copy, use, change and destroy the externally stored data. Thus, for example, in prior art systems, a hacker or other nefarious user who gains possession of the user credentials, through hacking the user computer or a network the user computer is connected to or acquiring them from watching the user enter them or through any other means, essentially has the same access rights as the user would have. This is clearly a security issue in those prior art systems, since user credentials are often treated somewhat casually in prior art systems by the user credential owners, and are also often entered multiple times a day. Casual treatment of the electronic device or the credentials, and the ability for an unrelated, or even nefarious, user to utilize those user credentials as if the nefarious or unrelated user was the user credential owner leave user data of all types vulnerable to discovery, tampering, destruction, or other undesired actions. This security deficiency of prior art systems is ubiquitous because of the common nature of current data access mechanisms and processes.

Further, the problem is internet centric, due to the way external databases are employed and accessed throughout modern networks.

Embodiments of the present disclosure address some of the shortcomings associated with prior art processes employed for database access and data management by using live biometric data received from a biometric device of a user computing system as a key or index to a database zone of the user.

In one embodiment, live biometric data is created, received or otherwise made available to one or more application processes or programs. The live biometric data is then used as a key to identify one or more particular database zones associated with the biometric data. Access rights are developed and granted to a user computing system providing the live biometric data, whether that live biometric data is provided through a previously known computing system, or is alternatively provided through a computing system that has not previously accessed the database zone.

Using live biometric data as a key to develop and apply the access rights ensures that a data owner associated with user data stored within the database zone is physically present at the computing system being granted the access rights, thus solving the internet centric and ubiquitous security problem outlined above in a convenient manner easily employed within existing computing systems having biometric devices.

Figure 1:
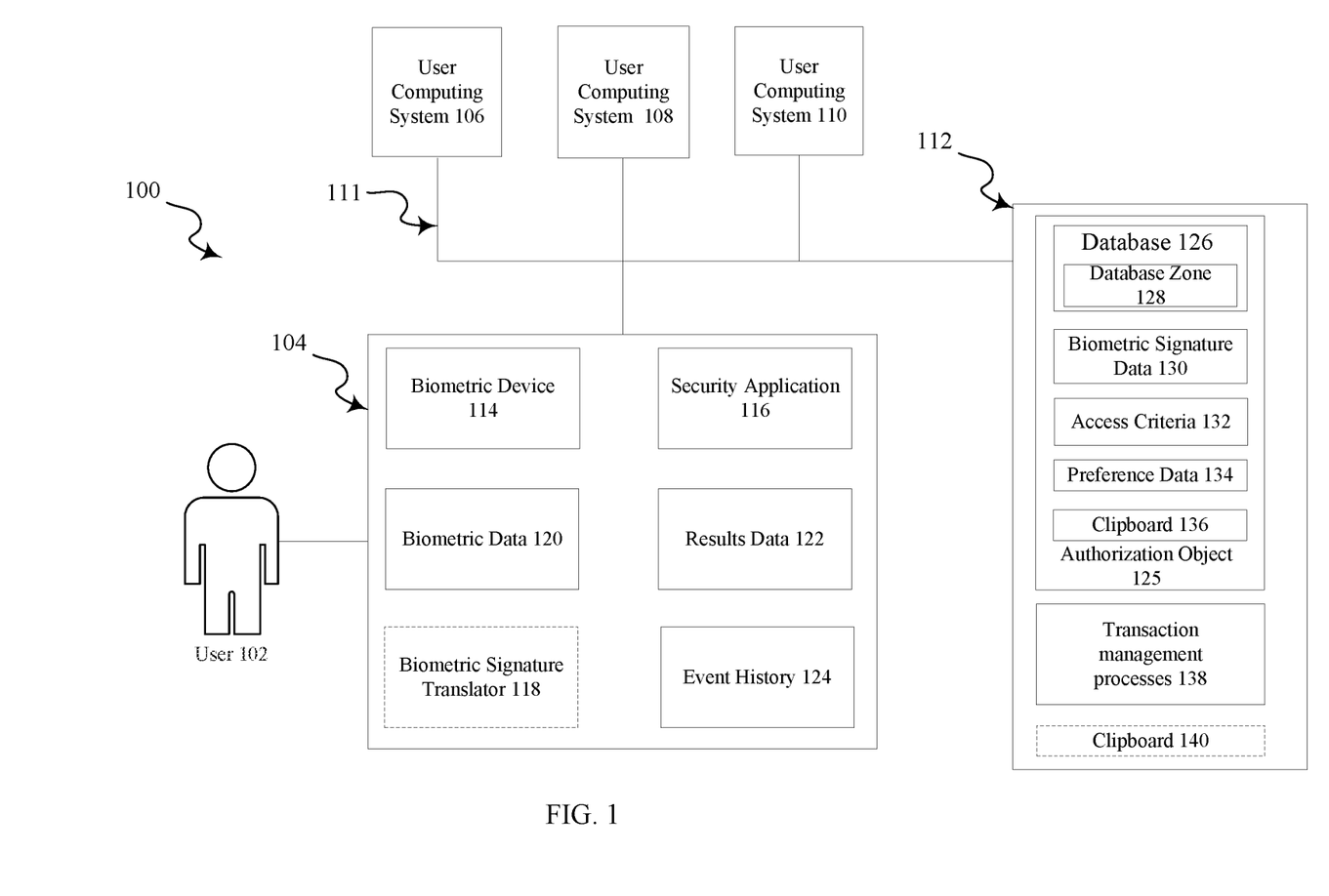
FIG. 1 is a block diagram of an architecture for providing a method and system for employing biometric data to authorize cloud based transactions, in accordance with one embodiment.

FIG. 1 is a block diagram of an architecture for providing a method and system for employing biometric data to authorize cloud based transactions, in accordance with one embodiment.

Referring to FIG. 1, in one embodiment, a method and system for employing biometric data to authorize cloud based transactions includes at least one user, such as user 102 interacting with one or more computing systems, such as one or more of user computing systems 104, 106, 108 and 110, having at least one computing processor and at least one memory coupled to the at least one computing processor, the memory including computing processor executable instructions for performing the process operations discussed herein.

In one embodiment, user computing systems 104, 106, 108 and 110 are coupled to each other and to another computing system, or a server, such as server 112, through a network and/or communications channels, such as channels 111.

As described above, the term "network" includes, but is not limited to, any network or network system such as, but not limited to, the following: a peer-to-peer network; a hybrid peer-to-peer network; a Local Area Network (LAN); a Wide Area Network (WAN); a public network, such as the Internet; a private network; a cellular network; any general network, communications network, or general network/communications network system; a wireless network; a wired network; a wireless and wired combination network; a satellite network; a cable network; any combination of different network types; or any other system capable of allowing communication between two or more assets, virtual assets, and/or computing systems, whether available or known at the time of filing or as later developed.

In one embodiment, computing system 104 includes one or more of biometric device 114, security application 116, and biometric signature translator 118, and, following the execution of one or more process operations disclosed herein, includes, in various embodiments, one or more of biometric data 120, results data 122, and event history 124.

In various embodiments, user computing systems 106, 108 and 110 are configured similarly to and thus include one or more of the same components included in user computing system 104 described herein. In one embodiment, one or more of user computing systems 104, 106, 108, and 110 are each operated, owned, or otherwise controlled by one or more users, such as user 102. Some computing systems have one primary computing system user, while others have two or more computing system users, each sharing the same computing system.

In one embodiment, server 112 manages, supports, and otherwise hosts authorization object 125 which controls access to database 126 and therefore also controls access to database zone 128. In one embodiment, authorization object 125 is a virtual machine instantiated to support database 126 on server 112.

Server 112 also includes, in various embodiments, one or more of biometric signature data 130, access criteria 132, preference data 134, clipboard 136, transaction management processes 138, and clipboard 140.

In one embodiment, a clipboard, such as clipboard 136, is a temporary data storage location within authorization object 125, and further operations, if any, performed on data stored in clipboard 136 require that a database session of a user be established prior to the user interacting with that clipboard data in future events, from other computing systems.

In one embodiment, a clipboard, such as clipboard 140, is a temporary storage location outside authorization object 125, and further operations, if any, performed on data stored in the clipboard location may be performed without a database session of a user being active at the time.

In practical operation, a user 102 of computing system 104 interacts with security application of user computing system 104 which triggers biometric device 114 so that live, as compared to previously determined and stored, biometric data 120 is created, generated or otherwise made available by biometric device 114, in one embodiment, and biometric data 120 is used by security application 116 together with transaction management processes 138 or authorization object 125 as an index or key to determine one or more particular database zones 128 of database 126 that are associated with biometric data 120 and thereby owned or otherwise controlled by user 102.

A biometric device, such as biometric device 114, is a device that has, as at least one of its primary purposes, the creation or generation of biometric data, e.g. physiological or behavioral characteristic data, such as biometric data 120, associated with identifying a user, such as user 102, of the biometric device. Typically, biometric devices, such as biometric device 114, include one or more of a fingerprint reader, a camera, iris or other eye-related devices, voice recognition devices, or any biometric device discussed herein and/or as known at the time of filing or later developed.

Further, biometric devices, such as biometric device 114, come in different forms, and thus produce or otherwise generate many different kinds of biometric data, such as biometric data 120, depending on the biometric characteristic the biometric device, such as biometric device 114, is designed to measure or use. Examples include, but are not limited to, fingerprint data from reading or otherwise capturing fingerprints of a user, such as user 102, palm print data from reading or otherwise capturing a palm print of a user, such as user 102, retina data from reading or otherwise capturing various features of a retina of a user, such as user 102, facial recognition data from reading or otherwise capturing a picture of the face of a user, such as user 102, and iris recognition data from reading an iris of a user, such as user 102 or any biometric data discussed herein and/or as known at the time of filing or later developed.

Using a biometric device, such as biometric device 114, that requires that a user, such as user 102, touch it, or at least get very close to it, in order to generate the biometric data, such as a fingerprint reader, as one example, or a retinal reader, as a second example, ensures that the user, such as user 102, is physically close to or in contact with at least the biometric device, and thus likely in control of that computing system. In contrast, a facial recognition system biometric device allows the user to be nearby, but not necessarily in physical contact with, nearby, or in control of the computing system coupled to the biometric device, such as biometric device 114, when biometric data, such as biometric data 120, is generated.

In one embodiment, when greater security is desired, more than one kind of biometric device, e.g. biometric devices measuring or otherwise capturing data relating to a different physical or physiological feature of the user, such as biometric device 114, is coupled to the same computing system, such as user computing system 104, such as a camera for facial recognition and a fingerprint reader for fingerprint recognition, and using both biometric devices to produce biometric data, such as biometric data 120, and then using the biometric data from both biometric devices to authenticate is required in order to access at least a portion of a database zone owned or otherwise controlled by the user, such as database zone 128.

In one embodiment, in order to determine access rights associated with given biometric data, such as biometric data 120, a match is sought between biometric data 120 and biometric signature data 130 of server 112. In one embodiment, it is not required that a perfect match be identified between biometric data 120 and biometric signature data 130 in order to grant access rights to a user, such as user 102, but rather that biometric data 120 and biometric signature data 130 match at least at or above a predetermined threshold. Thus, for example, in a situation where the predetermined threshold, such as a predetermined threshold of 80, expressed as a percentile, is identified by a data owner or a person in control of a given database zone, such as user 102, at least 80% of biometric data 120 must match a portion of biometric signature data 130 in order for a database session to be established for user 102. Such a predetermined threshold is stored within access criteria 132 of server 112, in one embodiment. Other predetermined thresholds are also available, in various embodiments, such as predetermined thresholds between 50% and 100%, depending on a degree of security desired by a system implementer. Higher percentages of matching are associated with higher degrees of security desired.

In one embodiment, biometric data, such as biometric data 120 is large and cumbersome to use for search operations, especially if database 126 has many associated database zones and therefore many different users. In one embodiment, at least a portion of biometric data 120 is hashed or otherwise shortened and obfuscated, and the shorted, obfuscated version is compared against similar shortened and obfuscated biometric signature data that has had the same shortening, obfuscating operations performed on it. In one embodiment, it is not necessary for the hashed or shortened, obfuscated version of biometric data 120 be unique to biometric data 120. Rather, if the hashed or shortened, obfuscated version of biometric data 120 compares favorably, e.g. matches at or above a predetermined threshold, with one or more different instances of shortened and obfuscated biometric data 130, a direct comparison of the associated biometric data 120 and biometric data 130 may then be made, to determine whether they match to within a predetermined threshold discussed herein.

Biometric signature data 130, as well as any access criteria, such as access criteria 132, include, but are not limited to, a determination, in advance of an access attempt, of what a predetermined threshold match must be, and are determined through a registration process performed when database zone 128 is first set up. Default access criteria may be provided by a system owner who provided server 112, if desired.

In one embodiment, access rights are developed and granted to the user computing system, such as user computing system 104, that provided the live biometric data, such as biometric data 120, and thus a computing system that is currently associated with the user, such as user 102, whether that live biometric data is provided through a computing system previously known to the system, or is alternatively provided through a computing system that has not previously accessed the database zone. A first set of predetermined access rights may be granted to a user 102, for example, if user 102 is using a user computing system that is known, e.g. previously used for access, such as user computing system 104. A second, different, set of predetermined access rights may be granted to a user 102, for example, if user 102 is using a user computing system that is not known, e.g. has not previously been used to access database zone 128, such as user computing system 106.

In one embodiment, providing live biometric data 120 through a user computing system previously known to the system, such as user computing system 104, or identified within a registration process or other activity allows the system to authorize one or more commands that are not authorized to be performed using a computing system, such as user computing system 106, that is not known to the system prior to the time the access rights are being determined.

In one embodiment, access rights to data of a database zone, such as database zone 128, are determined at least in part based on the character, e. g. facial recognition data, or fingerprint data, or palm print data, of the biometric data, such as biometric data 120, and whether a user, such as user 102, of biometric device 114 must be physically close to or in physical contact with biometric device 114 when biometric data 120 is produced.

In one embodiment, whether a given computing system, such as user computing system 104, can or can't be granted access rights, or what those access rights may be with respect to commands that may be issued, is determined in advance by the user, such as user 102, and stored in preference data 134. Note that database 126, database zone 128, biometric signature data 130, access criteria 132, preference data 134 and clipboard 136 are within authorization object 125 and therefore cannot be changed prior to a user, such as user 102 being authenticated through matching of biometric data 120 and biometric signature data 130. In one embodiment, clipboard 136 is exclusive to each individual user of authorization object 125, and therefore one clipboard 136 is only accessible to a second user after user 102 authorizes access to that second user. In one embodiment, whether data stored within either of clipboard 136 or 140 is made available to one or more other users of the system is determined by preference data submitted by user 102 either during a registration process when user 102 initially established ownership and/or control of database zone 128, or later when the data is copied to clipboard 136 or 140.

In one embodiment, following access rights being determined, which includes a determination of one or more commands or sets of commands that can be performed on data of database zone 128, a user interface is developed and presented to user 102 of user computing system 104, the user interface presenting a list or menu of operations and commands available to user 102.

In one embodiment, the one or more commands of the menu or list include commands that trigger the performance of one or more operations on data stored within the database zone. In various embodiments, the commands include one or more of a select data command, a copy command, a delete command, a command to transfer data to a clipboard, a command to transfer data from one database location to another, and an execute command (in the case of an executable application program, for example, being stored within the database zone of the user).

In one embodiment, as an example, a command to transfer a copy of data to a clipboard, for possible later transfer to another person who has their own database zone already allocated, may incorporate a copy command and a store command, where the copy command copies selected data of the database zone into memory, and the store command then stores that selected/copied data to a clipboard storage location, such as clipboard 136. Thus, such a command would duplicate and transfer data from database zone 128 to clipboard 136 which is inside authentication object 125 and thus still subject to the authentication and database session establishment processes discussed herein.

In one embodiment, as an example, a command to transfer a copy of data to a clipboard, for possible later transfer to another person who does not have their own database zone, may incorporate a copy command and a store command, where the copy command copies selected data from database zone 128 into memory, and the store command then stores that selected/copied data to a clipboard, such as clipboard 140. Thus, such a command would duplicate and transfer data from database zone 128 to clipboard 140 which is outside authentication object 125 and thus not subject to the authentication processes discussed herein.

In one embodiment, a user, such as user 102, who has been identified using biometric data 120 has access to clipboard 140 and thus may copy from clipboard 140, delete data that is stored within clipboard 140, and transfer data to clipboard 140.

In one embodiment, when a user, such as user 102, has submitted biometric data, such as biometric data 120, into the system in order for access rights to be determined, if there is data already stored on either of clipboard 136 and clipboard 140, user 102, once validated as providing biometric data 120 that matches biometric signature data 130 within a predetermined tolerance, is offered an opportunity to copy or otherwise transfer that clipboard data to another storage location. In one embodiment, in a situation where that person is using a user computing system known to the system, a finger print or other biometric data may be provided by that person to authorize transfer of the clipboard data from either of clipboard 136 or clipboard 140 to a database zone owned or otherwise controlled by the person. In one embodiment, in a situation where that person is using a user computing system known to the system, a finger print or other biometric data may be provided by that person to authorize transfer of the clipboard data from either of clipboard 136 or clipboard 140 to any other storage location indicated by the person, such as a storage location on that person's user computing system.

In one embodiment, the method further includes receiving, through a user interface of the first computing system, one or more commands that trigger the performance of one or more operations on data stored within the database zone. In various embodiments, The commands include one or more of a select data command, a copy command, a delete command, a command to transfer data to a clipboard, a command to transfer data from one database location to another, and an execute command (in the case of an executable application program, for example, being stored within the database zone of the user).

In one embodiment, the method further includes performing, as a result of the triggering, the one or more operations on data stored within the database zone. For example, a command to transfer a copy of data to a clipboard, for possible later transfer to another person who may not have their own database zone already allocated, may incorporate a copy command and a store command, where the copy command copies selected data in memory, and the store command then stores that selected/copied data to a clipboard storage location.

In one embodiment, the method receives, as a result of performing one or more operations on data stored within the database zone, results data resulting from performance of the one or more operations.

In one embodiment, results data 122 is generated, by security application 116 or transaction management processes 140, and reflects data indicating that one or more commands have been processed or executed by the system.

In one embodiment, results data 122 includes data indicating the success or failure of one or more operations initiated by the user to be performed on data of the database zone. Such results data 122 includes, in one embodiment, a command initiated by the user, any process operations that need to be performed in order to successfully perform the command, a time the command was issued, a time when the command was either successfully performed, and a final status of the performance of the command, e.g. success or failure.

In one embodiment, a history log, such as event history 124 is prepared which records one or more of actions taken on data, a time, date or both when the action was taken, which data each action was taken on, whether the action was performed successfully, and if the action was not performed successfully, a failure reason, failure code, or other description of conditions of or surrounding the failure.

In one embodiment, should the same user 102 move to a different, second computing system, such as computing system 106 owned and usually controlled by a different person or user, and authenticate using biometric data which points to a same database zone 128 where data was copied to a clipboard, for example, user 102 is presented with options to move the data to a storage location outside the database zone, such as, for example, to a storage location within the second computing system, or to another location.

In one embodiment, authentication using biometric data and granting access to a database zone is for a predefined time period, and access to the database zone is automatically terminated after that predefined time period elapses following authentication being completed.

In one embodiment, an active database session allowing a user to use a database zone is terminable by the user. In one embodiment, termination of an active database session occurs when the user engages the biometric process at a later time, while the database session is still valid. Thus, for example, when the user uses their own smartphone and access is granted through use of a biometric device of that smartphone, and the user optionally performs one or more commands on data of the database zone, and then authenticates or otherwise initiates or completes establishment of a database session using a second smartphone, such as the smartphone of a colleague, the establishment of a database session using a second smartphone terminates all other active database sessions. The first database session would terminate as to the user's smartphone, during or following a time period while the second database session for the colleague's smartphone is being activated, or is active.

Correspondingly, should the user be granted access in a first database session and that current database session with the database zone be active when the user begins a new database session again using the same biometric device, the current database session terminates, as if a manual logoff command had instead been issued.

In one embodiment, whether a current database session terminates or not based on a second database session being established is determined, in one embodiment, based on one or more predetermined user preferences of preference data 134. In one embodiment, those preferences are set up during a first database session established when the user first registers with the system and creates a database zone for its use.

Figure 2:
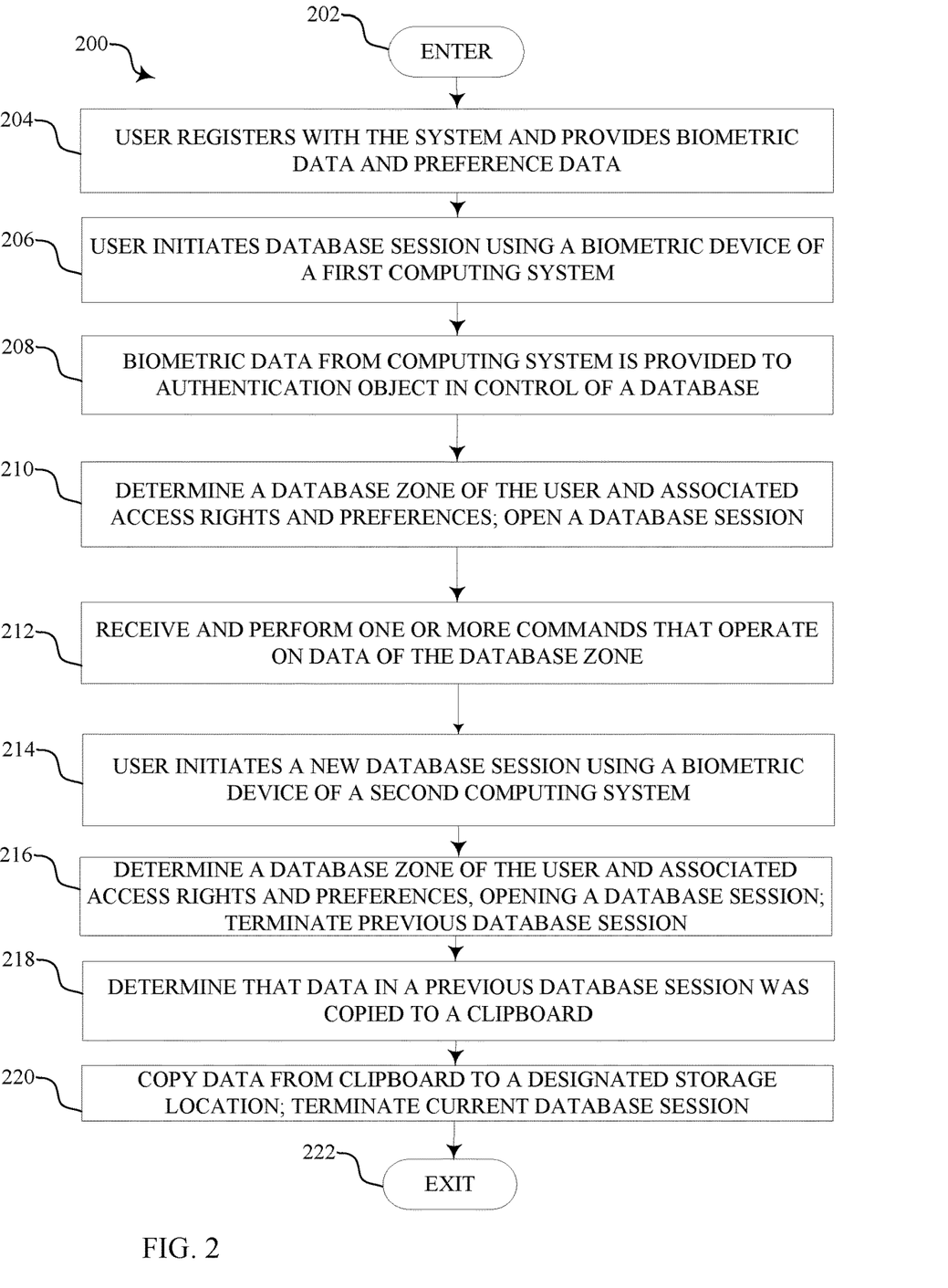
FIG. 2 is a flow chart representing one example of a process for employing biometric data to authorize cloud based transactions, in accordance with one embodiment.

FIG. 2 is a flow chart representing one example of a process for employing biometric data to authorize and perform cloud based transactions, in accordance with one embodiment.

Referring to FIG. 1 and FIG. 2 together, a method for employing biometric data to authorize cloud based transactions 200 begins at ENTER OPERATION 202 and proceeds with USER REGISTERS WITH THE SYSTEM AND PROVIDES BIOMETRIC DATA AND PREFERENCE DATA OPERATION 204.

In one embodiment, at USER REGISTERS WITH THE SYSTEM AND PROVIDES BIOMETRIC DATA AND PREFERENCE DATA OPERATION 204, a user, such as user 102 of user computing system 104, registers with the system, through an application program, such as security application 116 resident on user computing system 104, or through a web browser or a plug-in of a web browser. In one embodiment, one or more functions described herein as being performed by security application 116 are performed by a plug-in of a web browser.

During the registration process of USER REGISTERS WITH THE SYSTEM AND PROVIDES BIOMETRIC DATA AND PREFERENCE DATA OPERATION 204, user 102 interacts through security application 116 with biometric device 114 which triggers biometric device 114 so that live biometric data 120 is created, generated or otherwise made available, according to one embodiment.

Herein, a biometric device, such as biometric device 114, is a device that is typically attached to or is an integral component of a computing system, such as user computing system 104, wherein the biometric device has, as at least one of its primary purposes, the creation or generation of biometric data, e.g. physiological or behavioral characteristic data, representing a user, such as user 102, of the biometric device. Typically, such biometric devices include one or more of a fingerprint reader, a camera, iris or other eye-related devices, voice recognition devices, and the like.

In one embodiment, biometric data 120 created, generated or otherwise made available by biometric device 114, during the registration process of USER REGISTERS WITH THE SYSTEM AND PROVIDES BIOMETRIC DATA AND PREFERENCE DATA OPERATION 204 is transferred to server 112 and put into a lookup table or other index list to be used as an index to a newly created or already existing database zone. A database zone, such as database zone 128 is, in one embodiment, an exclusive area of a database, such as database 126, which is set aside for user 102. User 102 is considered to be the owner or is otherwise in control of database zone 128, after it is established in the registration process.

In one embodiment, the registration process also includes a setting of one or more user preferences, which are stored as preference data 134. In one embodiment, whether a given computing system can or cannot be granted access rights to a database zone of the user, or what those access rights may be with respect to commands that may be issued, is determined by the user at this time, and stored in preference data 134.

Further, in one embodiment, at USER REGISTERS WITH THE SYSTEM AND PROVIDES BIOMETRIC DATA AND PREFERENCE DATA OPERATION 204, the user may determine and set preferences as to when a given database session should terminate. For example, a user may elect, and set into their preferences, to terminate each database session after a predefined time period has passed, or to terminate each database session after a predefined time period has passed since a last database-related command has been issued by the user through a user application on the user's computing system, such as user computing system 104, or to terminate each database session when a new authentication attempt is initiated, perhaps such as the user moving from a first computing system, such as user computing system 104, to a second computing system, such as user computing system 106, and attempting to establish a second database session with user computing system 106, or to allow two or more concurrent database sessions to stay active so long as the two different computing systems associated with the two different sessions are computing systems that have previously been used by the user to access the database zone, or any other possible preferences that a system implementer may choose to include. Other preference settings are possible, and are within the scope and purpose of this disclosure.

Biometric signature data 130, as well as any access criteria such as a determination, in advance of an access attempt, of what a predetermined threshold match must be, are determined through a registration process performed when database zone 128 is first set up. Default access criteria may be provided by a system owner who provided server 112, if desired.

In one embodiment, following completion of USER REGISTERS WITH THE SYSTEM AND PROVIDES BIOMETRIC DATA AND PREFERENCE DATA OPERATION 204, process flow proceeds with USER INITIATES DATABASE SESSION USING A BIOMETRIC DEVICE OF A FIRST COMPUTING SYSTEM OPERATION 206.

In one embodiment, at USER INITIATES DATABASE SESSION USING A BIOMETRIC DEVICE OF A FIRST COMPUTING SYSTEM OPERATION 206, a user 102 of computing system interacts with security application 116 of user computing system 104 which triggers biometric device 114 so that live, as compared to previously determined and stored, biometric data 120 is created, generated or otherwise made available, in one embodiment, and biometric data 120 is collected by security application 116. Security application 116 then interacts with authorization object 125 at BIOMETRIC DATA FROM COMPUTING SYSTEM IS PROVIDED TO AUTHENTICATION OBJECT IN CONTROL OF A DATABASE OPERATION 208 which uses at least a portion of the received biometric data 120, at DETERMINE A DATABASE ZONE OF THE USER AND ASSOCIATED ACCESS RIGHTS AND PREFERENCES; OPEN A DATABASE SESSION OPERATION 210 as an index or key to determine one or more particular database zones associated with biometric data 120 and thereby owned or otherwise controlled by user 102. In one embodiment, if a match is determined at DETERMINE A DATABASE ZONE OF THE USER AND ASSOCIATED ACCESS RIGHTS AND PREFERENCES; OPEN A DATABASE SESSION OPERATION 210 between at least a portion of biometric data 120 and biometric signature data 130, a communications path is established between the matching database, such as database 126, and either the computing system that provided biometric data 120, such as user computing system 104, or security application 116 of the computing system that provided biometric data 120, such as user computing system 104.

In one embodiment, a single database zone is shared by two or more users, each having separate biometric data previously stored, such as biometric signature data 130, for use in determining a later match between live biometric data, such as biometric data 120, and the stored biometric data, such as biometric signature data 130. In one embodiment, database zones, such as database zone 128, may contain data that is exclusively owned or controlled by a single user, such as user 102, while other data may be owned or otherwise controlled by two or more users, such as user 102 and a user of user computing system 110, for example. In this embodiment, a first database zone may be exclusive to a first user, such as user 102, a second database zone may be exclusive to a second user, such as a user of user computing system 110, for example, and a third database zone may be shared by both users. Further, in the case of a database zone being shared by two or more users, access rights determined for each user are not, in one embodiment, identical. For example, a first user, such as user 102, may have read and write access to all of the data within a database zone, while a second user, such as a user of user computing system 110, may only have read access to a portion of the data of the database zone, such as database zone 128.

As discussed above, a biometric device, such as biometric device 114, is a device that has, as at least one of its primary purposes, the creation or generation of biometric data, e.g. physiological or behavioral characteristic data, representing a user, such as user 102, of the biometric device. Typically, biometric devices, such as biometric device 114, include one or more of a fingerprint reader, a camera, iris or other eye-related devices, voice recognition devices, and the like.

Further, biometric devices, such as biometric device 114, come in different forms, and thus produce or otherwise generate many different kinds of biometric data, such as biometric data 120, depending on the biometric characteristic the biometric device, such as biometric device 114 is designed to measure or use, such as fingerprint data from reading or otherwise capturing fingerprints of a user, such as user 102, palm print data from reading or otherwise capturing a palm print of a user, such as user 102, retina data from reading or otherwise capturing various features of a retina of a user, such as user 102, facial recognition data from reading or otherwise capturing a picture of the face of a user, such as user 102, and iris recognition data from reading an iris of a user, such as user 102.

Using a biometric device, such as biometric device 114, that requires that a user, such as user 102, touch it, or at least get very close to it, in order to generate the biometric data, such as a fingerprint reader, as one example, or a retinal reader, as a second example, ensures that the user, such as user 102, is physically close to or in contact with at least the biometric device, and thus likely in control of that computing system. In contrast, a facial recognition system biometric device allows the user to be nearby, but not necessarily in physical contact with, nearby, or in control of the computing system coupled to the biometric device, such as biometric device 114, when biometric data, such as biometric data 120, is generated.

In one embodiment, when greater security is desired, more than one kind of biometric device, e.g. biometric devices measuring or otherwise capturing data relating to different physical or physiological features of the user, such as biometric device 114, is coupled to the same computing system, such as user computing system 104, such as a camera for facial recognition and a fingerprint reader for fingerprint recognition, and using both biometric devices to produce biometric data, such as biometric data 120, and then using the biometric data from both biometric devices to authenticate is required in order to access at least a portion of a database zone owned or otherwise controlled by the user, such as database zone 128.

In one embodiment, following completion of DETERMINE A DATABASE ZONE OF THE USER AND ASSOCIATED ACCESS RIGHTS AND PREFERENCES; OPEN A DATABASE SESSION OPERATION 210, process flow proceeds with RECEIVE AND PERFORM ONE OR MORE COMMANDS THAT OPERATE ON DATA OF THE DATABASE ZONE OPERATION 212.

In one embodiment, at RECEIVE AND PERFORM ONE OR MORE COMMANDS THAT OPERATE ON DATA OF THE DATABASE ZONE OPERATION 212, the method further includes receiving, through a user interface of user computing system 104, one or more commands that trigger the performance of one or more operations on data stored within database zone 128. In various embodiments, the commands include one or more of a select data command, a copy command, a delete command, a command to transfer data to a clipboard, a command to transfer data from one database location to another, and an execute command (in the case of an executable application program, for example, being stored within the database zone of the user).

In an exemplary embodiment, user 104 is offered a menu of possible commands which are available to user 102, based on the previously determined access rights and user preferences. In this exemplary embodiment, user 102 selects a command to move data from its current location within database zone 128 to a temporary storage location, such as clipboard 136.

In one embodiment, as an example, a command to transfer a copy of data to a clipboard, for possible later transfer to another person who has their own database zone already allocated, may incorporate a copy command and a store command, where the copy command copies selected data of the database zone into memory, and the store command then stores that selected/copied data to a clipboard, such as clipboard 136. Thus, such a command would duplicate and transfer data from database zone 128 to clipboard 136 which is inside authentication object 125 and thus still subject to the authentication processes discussed herein.

In one embodiment, as an example, a command to transfer a copy of data to a clipboard, for possible later transfer to another person who does not have their own database zone, may incorporate a copy command and a store command, where the copy command copies selected data from database zone 128 into memory, and the store command then stores that selected/copied data to a clipboard, such as clipboard 140. Thus, such a command would duplicate and transfer data from database zone 128 to clipboard 140 which is outside authentication object 125 and thus not subject to the database session establishment processes discussed herein.

In one embodiment, a command that may be performed by an authorized user includes using data stored within the database zone to access yet another entity or object. For example, in one embodiment, where a bank account is accessible through the use of a token, expressed as token data within the database zone of the user, and where that token data is established and then stored within the database zone, a user who has authenticated using biometric data and who now has access to the database zone where the token data is stored may use that token data to access the bank account. In one embodiment, the access to the bank account is established, using the token data, automatically once the user is established as an authorized user of the database zone, and data from the database zone and the bank account may flow without further security restrictions.

In one embodiment, a user, such as user 102, who has been identified using biometric data 120 has access to clipboard 140 and thus may copy from clipboard 140, delete data that is stored within clipboard 140, and transfer data to clipboard 140.

In one embodiment, when a user, such as user 102, has submitted biometric data, such as biometric data 120, into the system in order for access rights to be determined, if there is data already stored on either of clipboard 136 and clipboard 140, user 102, once validated as providing biometric data 120 that matches biometric signature data 130 within a predetermined tolerance, is offered an opportunity to copy or otherwise transfer that clipboard data to another person. In one embodiment, in a situation where the computing system being used by the user is a known computing system, a fingerprint or other biometric data may be provided by that person to authorize transfer of the clipboard data from either of clipboard 136 or clipboard 140 to a database zone owned or otherwise controlled by the person. In one embodiment, in a situation where the computing system being used by the user is a known computing system, a fingerprint or other biometric data may be provided by that person to authorize transfer of the clipboard data from either of clipboard 136 or clipboard 140 to any other storage location desired by the person, such as a storage location on that person's computing system.

In one embodiment, a clipboard or other temporary storage location is within the database zone, and further operations, if any, performed on data stored in the clipboard require authentication of a user prior to interacting with that data in future events, from other computing systems, etc.

In one embodiment, a clipboard or other temporary location is outside the database zone, and further operations, if any, performed on data stored in the clipboard may be performed without biometric authentication of a user prior to interacting with that data in future events, from other computing systems, etc.

In one embodiment, the method further includes performing, as a result of the triggering, the one or more operations on data stored within the database zone. For example, a command to transfer a copy of data to a clipboard, for possible later transfer to another person who may not have their own database zone already allocated, may incorporate a copy command and a store command, where the copy command copies selected data in memory, and the store command then stores that selected/copied data to a clipboard storage location.

In one embodiment, the method receives, as a result of performing one or more operations on data stored within the database zone, results data resulting from performance of the one or more operations.

In one embodiment, results data 122 is generated, by security application 116 or transaction management processes 138, and reflects data indicating that one or more commands have been processed or executed by the system.

In one embodiment, results data 122 includes data indicating the success or failure of one or more operations initiated by the user to be performed on data of the database zone. Such results data 122 includes, in one embodiment, a command initiated by the user, any process operations that need to be performed in order to successfully perform the command, a time the command was issued, a time when the command was either successfully performed, and a final status of the performance of the command, e.g. success or failure.

In one embodiment, a history log, such as event history 124 is prepared which records one or more of actions taken on data, a time, date or both when the action was taken, which data each action was taken on, whether the action was performed successfully, and if the action was not performed successfully, a failure reason, failure code, or other description of conditions of or surrounding the failure.

Recall that user computing systems 106, 108, and 110 are configured similarly to computing system 104, as described herein. In the exemplary embodiment described above, if user 102 moves from user computing system 104 to a different, second computing system, such as computing system 106, generally owned and controlled by a different person or user, for example, user 102 interacts with biometric device 114 to generate biometric data 120 again, at USER INITIATES A NEW DATABASE SESSION USING A BIOMETRIC DEVICE OF A SECOND COMPUTING SYSTEM OPERATION 214 at a second computing system different from user computing system 104, such as computing system 106, for example, by interacting with a security application 116 of user computing system 106 which triggers biometric device 114 so that live, as compared to previously determined and stored, biometric data 120 is created, generated or otherwise made available, in one embodiment, and biometric data 120 is collected by security application 116 of user computing system 106.

In one embodiment, following establishment of a database session by the user at USER INITIATES A NEW DATABASE SESSION USING A BIOMETRIC DEVICE OF A SECOND COMPUTING SYSTEM OPERATION 214, process flow proceeds with DETERMINE A DATABASE ZONE OF THE USER AND ASSOCIATED ACCESS RIGHTS AND PREFERENCES, OPENING A DATABASE SESSION; TERMINATE PREVIOUS DATABASE SESSION OPERATION 216.

In one embodiment, at DETERMINE A DATABASE ZONE OF THE USER AND ASSOCIATED ACCESS RIGHTS AND PREFERENCES, OPENING A DATABASE SESSION; TERMINATE PREVIOUS DATABASE SESSION OPERATION 216, as before, biometric data 120 of user computing system 106 is used as an index or key to determine one or more particular database zones associated with biometric data 120 and thereby owned or otherwise controlled by user 102.

In one embodiment, if a match is determined at DETERMINE A DATABASE ZONE OF THE USER AND ASSOCIATED ACCESS RIGHTS AND PREFERENCES, OPENING A DATABASE SESSION; TERMINATE PREVIOUS SESSION OPERATION 216 between at least a portion of biometric data 120 (established at user computing system 106) and at least a portion of biometric signature data 130, a communications path is established between the matching database, such as database 126, and either the computing system that provided biometric data 120, such as user computing system 106, or security application 116 of the computing system that provided biometric data 120, such as user computing system 106. In one embodiment, if a previous database session is still open between computing system 104 and authorization object 125, that previous database session is terminated, based on user preference data of preference data 134, at some point after a match is determined between database zone 128 and user computing system 106. Recall that user computing system 106 is a computing system that is distinct from computing system 104 and may not have been previously known by the system. Therefore, user computing system 106 may be treated differently by the system than had the user used a known computing system, such as if they had used user computing system 104.

Following the determination of a databases zone of the user through matching at least a portion of biometric data 120 of user computing system 106 to at least a portion of biometric signature data 130 at DETERMINE A DATABASE ZONE OF THE USER AND ASSOCIATED ACCESS RIGHTS AND PREFERENCES, OPENING A DATABASE SESSION; TERMINATE PREVIOUS DATABASE SESSION OPERATION 216, process flow proceeds with DETERMINE THAT DATA IN A PREVIOUS DATABASE SESSION WAS COPIED TO A CLIPBOARD OPERATION 218.

In one embodiment, at DETERMINE THAT DATA IN A PREVIOUS DATABASE SESSION WAS COPIED TO A CLIPBOARD OPERATION 218, a determination is made that data is present on the clipboard, such as clipboard 136. Responsive to that determination, access rights are amended, if needed to ensure that the user, such as user 102, is able to operate on the clipboard data, such as to move it to the computing system, such as user computing system 106 that the user is currently using, to access database zone 128. For example, if the user did not already have access rights and the ability to copy, move or delete the clipboard data to the computing system, such as user computing system 106 that the user is currently using to access database zone 128, those options are made available to the user.

In one embodiment, the presence of data on clipboard 136 triggers an assumption that the user, such as user 102, wishes to move that data to the current computing system. In this exemplary embodiment, a popup window on computing system 106 asks user 102 whether the user wishes to move the data, and provides one or more options of data storage locations suitable for the data. In one embodiment, a suitable data storage location includes a different database zone not presently accessible to user 102. If user 102 indicates a desire to move the data to a different database zone, a prompt is, in one embodiment, prepared and presented to the user that requests for new biometric data which needs to be matched in order to determine and access the different database zone. If such an option is selected, authentication processes such as those described above are executed, and the data is moved, at COPY DATA FROM CLIPBOARD TO A DESIGNATED STORAGE LOCATION; TERMINATE CURRENT DATABASE SESSION OPERATION 220, if the database zone is accessible to whomever provided the new biometric data. In one embodiment, the current database session is terminated following the completion of the copy/move operation, regardless of where the data was moved.

In one embodiment, authentication using biometric data and granting access to a database zone is for a predefined time period, and access to the database zone is automatically terminated after that predefined time period elapses following authentication being completed.

In one embodiment, an active database session allowing a user to use a database zone is terminable by the user. In one embodiment, termination of an active database session occurs when the user engages the biometric process at a later time, while the database session is still active. Thus, for example, when the user uses their own smartphone and access is granted through use of a biometric device of that smartphone, and the user optionally performs one or more commands on data of the database zone, and then established a new database session using a second smartphone, such as the smartphone of a colleague, the establishment of a new database session such as those described herein terminates all other open sessions. The first database session would terminate as to the user's smartphone, during or following a time period while the second database session for the colleague's smartphone is being established, or is active.

Correspondingly, should the user be granted access in a first database session and that current database session with the database zone be active when the user begins a new database session again using the same biometric device, the current database session terminates, as if a manual logoff command had instead been issued.

In one embodiment, whether a current database session terminates or not based on a second database session being initiated is determined, in one embodiment, based on one or more predetermined user preferences of preference data 134. In one embodiment, those preferences are set up during a registration process when the user first creates a database zone for its use.

Process flow then proceeds with EXIT OPERATION 222 and the process awaits further data.

The order of operations in an actual implementation of the subject matter described herein need not be exactly the same as the exemplary embodiments discussed herein. For example, in one embodiment, following the determination of a databases zone of the user through matching at least a portion of biometric data 120 of user computing system 106 to at least a portion of biometric signature data 130 at DETERMINE A DATABASE ZONE OF THE USER AND ASSOCIATED ACCESS RIGHTS AND PREFERENCES, OPENING A DATABASE SESSION; TERMINATE PREVIOUS DATABASE SESSION OPERATION 216 process flow proceeds with RECEIVE AND PERFORM ONE OR MORE COMMANDS THAT OPERATE ON DATA OF THE DATABASE ZONE OPERATION 212 discussed above.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "accessing," "analyzing," "obtaining," "identifying," "associating," "aggregating," "initiating," "collecting," "creating," "transferring," "storing," "searching," "comparing," "providing," "processing" etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes by a computer program stored via a computer program product as defined herein that can be accessed by a computing system or other device to transform the computing system or other device into a specifically and specially programmed computing system or other device.

Those of skill in the art will readily recognize that the algorithms and operations presented herein are not inherently related to any particular computing system, computer architecture, computer or industry standard, or any other specific apparatus. It may prove convenient/efficient to construct or transform one or more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar and/or dissimilar computers and storage devices over a private network, a LAN, a WAN, a private network, or a public network, such as the Internet.

It should also be noted that the language used in the specification has been principally selected for readability, clarity, and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the drawing figures are identified using a particular nomenclature for ease of description and understanding, but other nomenclature is often used in the art to identify equivalent operations.

In the discussion above, certain aspects of one embodiment include process steps and/or operations and/or instructions described herein for illustrative purposes in a particular order and/or grouping. However, the particular order and/or grouping shown and discussed herein is illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein does not limit the scope of the invention as claimed below.

Therefore, numerous variations, whether explicitly provided for by the specification or implied by the specification or not, may be implemented by one of skill in the art in view of this disclosure.

What is claimed is:

1. A method for employing biometric data to authorize cloud-based data transactions and enforce cloud-based data security comprising:
   establishing, during a registration process, a database zone to be controlled by a user, wherein the database zone is an exclusive area of a database which is set aside for the user and further wherein the database zone is only accessible using biometric data of the user;
   generating authorization data by associating the biometric data of the user with the database zone;
   receiving first live biometric data generated through the user interacting with a first biometric device coupled to a first computing system, the first live biometric data uniquely identifying the user to which the biometric data applies, the first computing system being a system that has been previously identified as a known system;
   using the first live biometric data as a database index to determine and locate the database zone controlled by the user, wherein using the first live biometric data ensures that the user who controls the database zone is physically present at the first computing system;
   opening a secure channel between the first computing system and an authorization object responsible for securely managing access to the database zone; providing, from the first computing system using the secure channel, the first live biometric data to the authorization object;

determining, by the authorization object, whether the database zone controlled by the user is associated with authorization data matching the first live biometric data to at least a predetermined degree;

granting the first computing system access rights to the data stored within the database zone controlled by the user;

receiving, through a user interface of the first computing system, one or more first commands from the user that trigger the performance of one or more first operations on data stored within the database zone controlled by the user, wherein at least one of the commands is a copy data command which copies at least a portion of data stored within the database zone controlled by the user to a temporary storage location within the database zone controlled by the user;

performing, as a result of the triggering, the one or more first operations on data stored within the database zone controlled by the user;

receiving second live biometric data generated through the user interacting with a second biometric device coupled to a second computing system, wherein the second live biometric data uniquely identifies the user, and further wherein the second computing system has not been previously identified as a known system;

using the second live biometric data as a database index, to determine and locate the database zone controlled by the user, wherein using the second live biometric data ensures that the user who controls the database zone is physically present at the second computing system;

determining, by the authorization object, that the database zone controlled by the user is associated with authorization data matching the second live biometric data to at least a predetermined degree;

granting the second computing system access rights to the data copied to the temporary storage location within the database zone controlled by the user;

receiving, through a user interface of the second computing system, one or more second commands from the user that trigger the performance of one or more second operations on the data copied to the temporary storage location within the database zone controlled by the user;

performing, as a result of the receiving one or more second commands, the one or more second operations on the data copied to the temporary storage location within the database zone controlled by the user;

receiving results data resulting from performance of the one or more operations on the data copied to the temporary storage location within the database zone controlled by the user.

2. The method of claim 1 wherein the one or more commands received at either of the first computing system or the second computing system include one or more commands selected from a group of commands consisting of:
   a copy command;
   a transfer command;
   a delete command;
   an insert command; and
   a command to move at least a portion of the data into a database zone controlled by an owner of the second computing system.

3. The method of claim 1 wherein at least one of the first live biometric data and the second live biometric data are selected from the group of biometric data consisting of:
   fingerprint data;
   palm print data;
   retina data;
   facial recognition data; and
   iris recognition data.

4. The method of claim 1 wherein granting the first computing system access rights to the data stored within the database zone controlled by the user comprises:
   granting, if the authorization object determined that a database zone controlled by a user is associated with authorization data matching the first live biometric data to at least a predetermined degree, a first user rights to data of the database zone, based on the first live biometric data and predetermined rights data associated with the authorization data;
   denying access, by the authorization object to the first user, following a determination that there is no database zone controlled by a user associated with authorization data matching the first live biometric data to at least a predetermined degree.

5. The method of claim 4 wherein opening a secure channel between the first computing system and an authorization object responsible for securely managing access to one or more database zones comprises:
   opening, by a security application program on the first computing system, a secure channel between the application program of the first computing system and an authorization object responsible for securely managing access to one or more database zones.

6. The method of claim 1 further comprising receiving third live biometric data from a third biometric device coupled to the second computing system, wherein generation of at least one of the second or third live biometric data requires that a first user be in physical contact with the second computing system, and further wherein granting the second computing system access rights to the data copied to the temporary storage location comprises:
   determining, by the authorization object, that a database zone controlled by a user is associated with first authorization data matching the second live biometric data to at least a predetermined degree;
   determining, by the authorization object, that the third live biometric data matches second authorization data to at least a predetermined degree; and
   thirdly accessing, by the second computing system using the second live biometric data as a database index, following the authorization object determining that a database zone controlled by a user is associated with authorization data matching the first live biometric data to at least a predetermined degree, and also following the authorization object determining that the third live biometric data matches second authorization data to at least a predetermined degree, the data copied to the temporary storage location.

7. A system for employing biometric data to authorize cloud-based data transactions and enforce cloud-based data security comprising:
   one or more computing processors; and
   one or more memories coupled to the one or more computing processors, the one or more memories having stored therein processor executable instructions which when executed by the one or more computing processors, perform a process comprising:

establishing, during a registration process, a database zone to be controlled by a user, wherein the database zone is an exclusive area of a database which is set aside for the user and further wherein the database zone is only accessible using biometric data of the user;

generating authorization data by associating the biometric data of the user with the database zone;

receiving first live biometric data generated through the user interacting with a first biometric device coupled to a first computing system, the first live biometric data uniquely identifying the user to which the biometric data applies, the first computing system being a system that has been previously identified as a known system;

using the first live biometric data as a database index to determine and locate the database zone controlled by the user, wherein using the first live biometric data ensures that the user who controls the database zone is physically present at the first computing system;

opening a secure channel between the first computing system and an authorization object responsible for securely managing access to the database zone;

providing, from the first computing system using the secure channel, the first live biometric data to the authorization object;

determining, by the authorization object, whether the database zone controlled by the user is associated with authorization data matching the first live biometric data to at least a predetermined degree;

granting the first computing system access rights to the data stored within the database zone controlled by the user;

receiving, through a user interface of the first computing system, one or more first commands from the user that trigger the performance of one or more first operations on data stored within the database zone controlled by the user, wherein at least one of the commands is a copy data command which copies at least a portion of data stored within the database zone controlled by the user to a temporary storage location within the database zone controlled by the user;

performing, as a result of the triggering, the one or more first operations on data stored within the database zone controlled by the user;

receiving second live biometric data generated through the user interacting with a second biometric device coupled to a second computing system, wherein the second live biometric data uniquely identifies the user, and further wherein the second computing system has not been previously identified as a known system;

using the second live biometric data as a database index, to determine and locate the database zone controlled by the user, wherein using the second live biometric data ensures that the user who controls the database zone is physically present at the second computing system;

determining, by the authorization object, that the database zone controlled by the user is associated with authorization data matching the second live biometric data to at least a predetermined degree;

granting the second computing system access rights to the data copied to the temporary storage location within the database zone controlled by the user;

receiving, through a user interface of the second computing system, one or more second commands from the user that trigger the performance of one or more second operations on the data copied to the temporary storage location within the database zone controlled by the user;

performing, as a result of the receiving one or more second commands, the one or more second operations on the data copied to the temporary storage location within the database zone controlled by the user;

receiving results data resulting from performance of the one or more operations on the data copied to the temporary storage location within the database zone controlled by the user.

8. The system of claim 7 wherein the one or more commands received at either of the first computing system or the second computing system include one or more commands selected from a group of commands consisting of:
   a copy command;
   a transfer command;
   a delete command;
   an insert command; and
   a command to move at least a portion of the data into a database zone controlled by an owner of the second computing system.

9. The system of claim 7 wherein at least one of the first live biometric data and the second live biometric data are selected from the group of biometric data consisting of:
   fingerprint data;
   palm print data;
   retina data;
   facial recognition data; and
   iris recognition data.

10. The system of claim 7 wherein granting the first computing system access rights to the data stored within the database zone controlled by the user comprises:
   granting, if the authorization object determined that a database zone controlled by a user is associated with authorization data matching the first live biometric data to at least a predetermined degree, a first user rights to data of the database zone, based on the first live biometric data and predetermined rights data associated with the authorization data,
   denying access, by the authorization object to the first user, following a determination that there is no database zone controlled by a user associated with authorization data matching the first live biometric data to at least a predetermined degree.

11. The system of claim 10 wherein opening a secure channel between the first computing system and an authorization object responsible for securely managing access to one or more database zones comprises:
   opening, by a security application program on the first computing system, a secure channel between the application program of the first computing system and an authorization object responsible for securely managing access to one or more database zones.

12. The system of claim 7 further comprising receiving third live biometric data from a third biometric device coupled to the second computing system, wherein generation of at least one of the second or third live biometric data requires that a first user be in physical contact with the second computing system, and further wherein granting the second computing system access rights to the data copied to the temporary storage location comprises:

determining, by the authorization object, that a database zone controlled by a user is associated with first authorization data matching the second live biometric data to at least a predetermined degree;

determining, by the authorization object, that the third live biometric data matches second authorization data to at least a predetermined degree; and thirdly accessing, by the second computing system using the second live biometric data as a database index, following the authorization object determining that a database zone controlled by a user is associated with authorization data matching the first live biometric data to at least a predetermined degree, and also following the authorization object determining that the third live biometric data matches second authorization data to at least a predetermined degree, the data copied to the temporary storage location.

13. A system for employing biometric data to authorize cloud-based data transactions and enforce cloud-based data security comprising:

a first user computing system having a first biometric device coupled thereto, the first biometric device configured to create biometric data representative of a characteristic of a user of the first user computing system;

a second user computing system having a second biometric device coupled thereto, the second biometric device configured to create biometric data representative of a characteristic of a user of the second user computing system;

a database coupled to the first and second user computing systems, and further coupled to an authorization object, the authorization object configured to govern access to database zones of the database;

the system configured to:

establish, during a registration process, a database zone to be controlled by a user, wherein the database zone is an exclusive area of a database which is set aside for the user and further wherein the database zone is only accessible using biometric data of the user;

generate authorization data by associating the biometric data of the user with the database zone;

receive first live biometric data generated through the user interacting with the first biometric device, the first live biometric data uniquely identifying the user to which the biometric data applies, the first computing system being a system that has been previously identified as a known system;

use, by the first user computing system, the first live biometric data as a database index to determine and locate the database zone controlled by the user, wherein using the first live biometric data ensures that the user who controls the database zone is physically present at the first computing system;

open a secure channel between the first computing system and an authorization object responsible for securely managing access to the database zone;

provide, from the first computing system using the secure channel, the first live biometric data to the authorization object;

determine, by the authorization object, whether the database zone controlled by the user is associated with authorization data matching the first live biometric data to at least a predetermined degree;

grant the first computing system access rights to the data stored within the database zone controlled by the user;

receive, through a user interface of the first user computing system, one or more first commands from the user that trigger the performance of one or more first operations on data stored within the database zone controlled by the user, wherein at least one of the commands is a copy data command which copies at least a portion of data stored within the database zone controlled by the user to a temporary storage location within the database zone controlled by the user;

perform, as a result of the triggering, the one or more first operations on data stored within the database zone controlled by the user;

receive second live biometric data generated through the user interacting with the second biometric device, the second live biometric data uniquely identifying the user, and further wherein the second computing system has not been previously identified as a known system;

use the second live biometric data as a database index, to determine and locate the database zone controlled by the user, wherein using the second live biometric data ensures that the user who controls the database zone is physically present at the second computing system;

determine, by the authorization object, that the database zone controlled by the user is associated with authorization data matching the second live biometric data to at least a predetermined degree;

grant the second computing system access rights to the data copied to the temporary storage location within the database zone controlled by the user;

receive, through a user interface of the second computing system, one or more second commands from the user that trigger the performance of one or more second operations on the data copied to the temporary storage location within the database zone controlled by the user;

perform, as a result of the receiving one or more second commands, the one or more second operations on the data copied to the temporary storage location within the database zone controlled by the user;

receive results data resulting from performance of the one or more operations on the data copied to the temporary storage location within the database zone controlled by the user.

14. The system of claim 13 wherein the one or more commands received at either of the first user computing system or the second user computing system include one or more commands selected from a group of commands consisting of:

a copy command;
a transfer command;
a delete command;
an insert command; and
a command to move at least a portion of the data into a database zone controlled by an owner of the second computing system.

15. The system of claim 13 wherein at least one of the first live biometric data and the second live biometric data are selected from the group of biometric data consisting of:

fingerprint data;
palm print data;
retina data;
facial recognition data; and
iris recognition data.

16. The system of claim 13 wherein granting the first computing system access rights to the data stored within the database zone controlled by the user comprises:
- granting, if the authorization object has determined that a database zone controlled by a user is associated with authorization data matching the first live biometric data to at least a predetermined degree, the first user rights to data of the database zone, based on the first live biometric data and predetermined rights data associated with the authorization data; and
- denying access, by the authorization object to the first user, following a determination that there is no database zone controlled by a user associated with authorization data matching the first live biometric data to at least a predetermined degree.

17. The system of claim 16 wherein opening a secure channel between the first user computing system and the authorization object responsible comprises:
- opening, by a security application program on the first user computing system, a secure channel between the application program of the first user computing system and an authorization object responsible for securely managing access to one or more database zones.

18. The system of claim 13 further comprising receiving third live biometric data from a third biometric device coupled to the second user computing system, wherein generation of at least one of the second or third live biometric data requires that a first user be in physical contact with the second user computing system, and further wherein granting the second computing system access rights to the data copied to the temporary storage location comprises:
- determining, by the authorization object, that a database zone controlled by a user is associated with first authorization data matching the second live biometric data to at least a predetermined degree;
- determining, by the authorization object, that the third live biometric data matches second authorization data to at least a predetermined degree; and
- thirdly accessing, by the second user computing system using the second live biometric data as a database index, following the authorization object determining that a database zone controlled by a user is associated with authorization data matching the first live biometric data to at least a predetermined degree, and also following the authorization object determining that the third live biometric data matches second authorization data to at least a predetermined degree, the data copied to the temporary storage location.

* * * * *